United States Patent Office 3,048,762
Patented Aug. 7, 1962

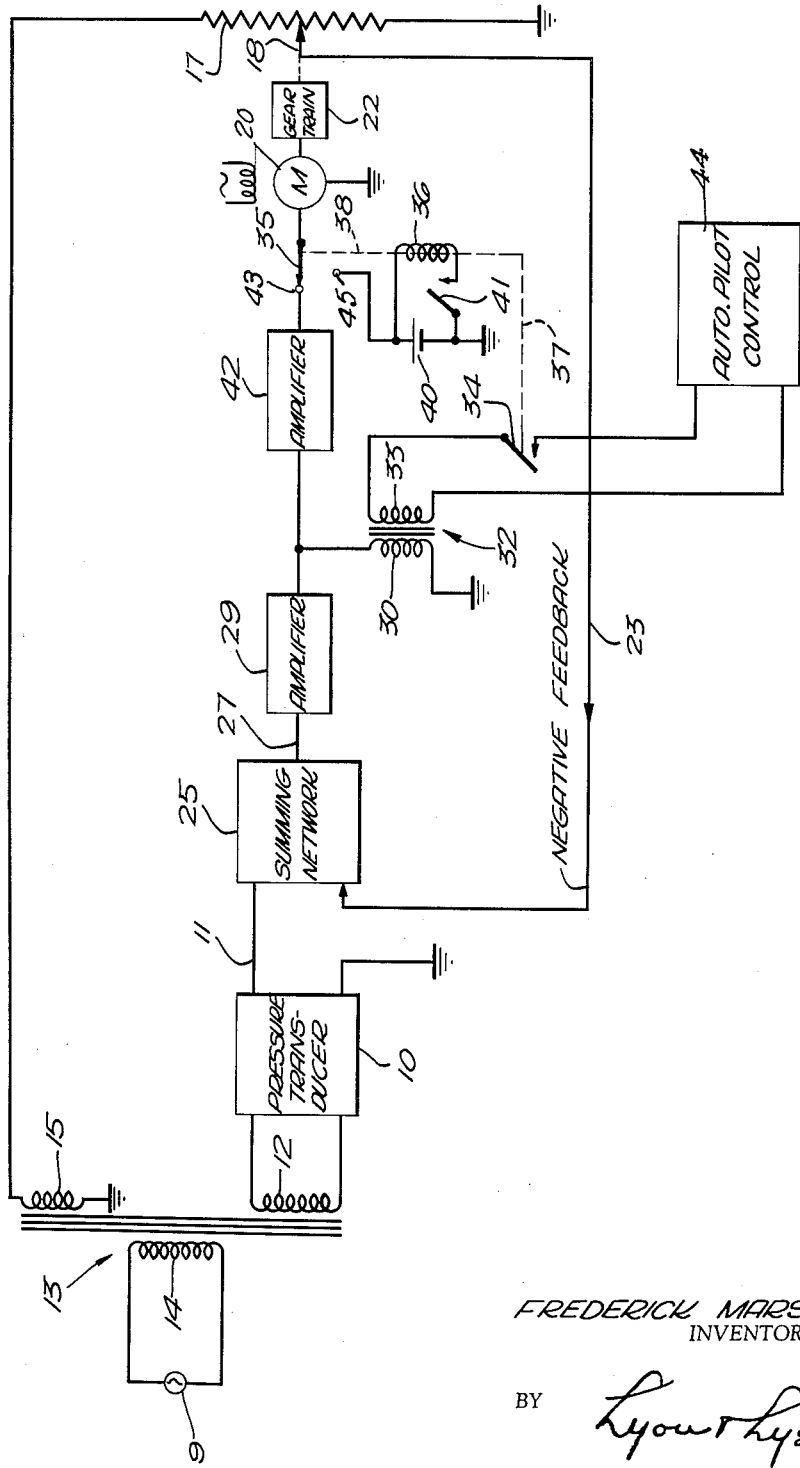

3,048,762
ALTITUDE INDICATING OR CONTROL
SERVOSYSTEM
Frederick Marsh, Anaheim, Calif., assignor, by mesne assignments, to Litton Industries, Inc., Beverly Hills, Calif., a corporation of Delaware
Filed May 18, 1959, Ser. No. 813,923
5 Claims. (Cl. 318—489)

The present invention relates to improved means and techniques particularly applicable to altitude controllers servo systems.

There is disclosed herein an altitude controller which may function either in an unengaged or an engaged mode. In the unengaged mode the altitude controller performs essentially as a precision altimeter providing effectively instantaneous altitude or pressure information either in terms of a voltage or in terms of a position of a rotatable shaft. In the engaged mode the altitude controller provides precise information with respect to deviation from a particular pressure previously established at that time when the system is changed from the unengaged mode to the engaged mode.

An object of the present invention is to provide a system of this character which is relatively simple, foolproof and in particular requires no clutching or spring null return elements so that transition between the engaged and disengaged modes is accomplished smoothly in the complete absence of a "jump" signal.

Another object of the present invention is to provide an improved altimeter in which pressure variations may be indicated either in terms of a voltage or in terms of a shaft position.

Another object of the present invention is to provide an improved altitude controller in which the output voltage directed to, for example, an auto pilot, is maintained substantially at a zero voltage in the unengaged mode, even though there may be variations in pressure due to altitude, so that substantially no residual voltage is present at the time the system is converted from its unengaged condition to its engaged condition.

Another object of the present invention is to provide an improved system of this character which may be made small in both weight and size.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The single FIGURE of the drawing illustrates a system embodying features of the present invention.

Referring to the drawing, the system shown therein may be mounted in an aircraft or missile and in general incorporates means for sensing ambient pressures. Such means may comprise a conventional pressure transducer 10 of, for example, a bridge type supplied with voltage from a source 9 and functioning to develop on the output lead 11 an A.C. voltage having an amplitude representative of the particular pressure sensed by the transducer 10.

For this purpose the transducer 10 has a pair of terminals connected to the secondary winding 12 of transformer 13 which has its primary winding 14 connected to the source 11.

A second secondary winding 15 of transformer 13 has one of its terminals grounded and the other one of its terminals connected to the potentiometer-type resistance 17 having one of its terminals grounded.

This resistance 17 has an adjustable tap 18 thereon adjustable by the motor 20 through the gear train 22; and this tap 18 is electrically connected through the lead 23 which supplies a negative feedback voltage to one input terminal of the summing network 25. A second input terminal of the network 25 has applied thereto the aforementioned A.C. voltage developed on lead 11 representative of pressure sensed by the transducer 10.

These two voltages on leads 11 and 23 are algebraically added and the resultant of this addition appears as an output voltage on lead 27, such latter voltage being amplified in a stabilized amplifier 29.

The output of amplifier 29 is applied to the primary winding 30 of the output transformer 32 having a secondary winding 33 coupled through relay switch 34 to the auto pilot control 44.

This relay switch 34 is open in the "unengaged" position of the system illustrated in the drawing. This switch 34 as well as the single pole, double throw relay switch 35 is operated by the relay coil 36 as indicated by the dotted lines 37 and 39. The relay winding 36 may be energized from the D.C. source 40 upon closing the switch 41 manually or otherwise.

In the energized condition of the relay winding 36, the ungrounded terminal of the D.C. source 40 is connected through the switch 35 to the ungrounded terminal of the two-phase alternating current servo motor 20 of conventional construction so as to lock its output shaft in fixed position and to thereby establish or fix the position of the motor driven tap 18.

In the "unengaged" condition or mode, the switch 41 is opened, either manually or otherwise, in which case the relay winding 36 is de-energized and the switch 34 is opened and movable contact of switch 35 now engages the fixed contact 43 instead of the fixed contact 45. Thus, the motor 20 is no longer locked in position but is energized in accordance with the output of the power amplifier 42 having its input coupled to the output of the previously mentioned amplifier 29.

In such "unengaged" condition or mode a servo loop is completed and the tap 18 is automatically adjusted to maintain the voltage on lead 27 substantially constant, i.e. at a substantially zero value. For these purposes the A.C. voltages appearing on the leads 11 and 23 are 180° out of phase and the tap 18 is automatically adjusted so that the amplitude of the voltage on lead 23 is substantially equal to the amplitude of the A.C. voltage on lead 11 and representative of pressure.

In other words, when and as the voltage on lead 27 tends to deviate from a zero value, the motor 20 is energized to drive the tap 18 in such direction as to reduce such assumed voltage on lead 27 to zero. This means that the voltage developed across the secondary winding 33 is also maintained at a zero value in the unengaged mode. This is a particular advantage in that when the system is subsequently changed from an unengaged to an engaged mode, the voltage at that instant applied to the auto pilot 44 is substantially zero, i.e. there is no jump voltage present which otherwise may produce undesirable transient conditions that have a noticeable effect on the flight of the aircraft or missile in, for example, those instances where it is desired that the aircraft or missile fly at an altitude determined by the pressure sensed by the transducer 10.

Thus, in operation the system in its unengaged mode develops a voltage on both leads 11 and 23, each of which is representative of the altitude, and the amplitudes of either one of such voltages may be measured or indicated for an indication of pressure. Also, the particular position of shaft 18 is an indication of the pressure as well as the angular position of the shaft of motor 20 or a shaft in the gear train 22 and the angular position of such shaft may be used as an indication of altitude or pressure. During such unengaged position the auto pilot 44 is not controlled since the switch 34 is open, but when and as the altitude changes, the voltage across the secondary winding 33 is maintained at a substantially zero value, thus in a condition where transient conditions are not likely to occur when subsequently the system is conditioned for operation in the engaged mode. In this latter instance the servo loop established in the unengaged mode is now broken and the tap 18 is fixed in position with the voltage appearing on such tap 18 serving as a "memory" voltage representative of a particular altitude. Any deviations from such determined altitude result in corresponding deviations in voltage appearing across secondary winding 33 which are applied to the auto pilot for control of the auto pilot. The particular type of auto pilot control may take many different forms and may function, for example, to maintain flight of an aircraft or missile at a predetermined fixed altitude; or the control voltage may be used to modify other voltages for producing a compensatory effect.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an altitude controlling system, a pressure transducer producing a voltage representative of pressure, a servo loop, said servo loop comprising a network developing a feedback voltage representative of the previously mentioned voltage, means for effecting a comparison between said voltages, a potentiometer resistance having a tap adjusted in accordance with the algebraic sum of the two voltages, an output device coupled to said servo loop and developing an output voltage which is representative of the algebraic sum of said two voltages, an auto pilot control, and means simultaneously effective for applying said output voltage to said auto pilot control and for rendering said servo loop ineffective to vary said feedback voltage.

2. A servo system for indicating and controlling the altitude of an aircraft, comprising: a pressure transducer for producing a voltage representative of the altitude of an aircraft; feedback signal producing means; means for comparing said voltage and said feedback signal and producing a comparison signal corresponding to the algebraic sum of said voltage and said feedback signal; means responsive to said comparison signal for adjusting said feedback signal to reduce said comparison signal to zero and means for simultaneously disabling said last named means and applying said difference signal to an external utilization device.

3. A servo system for indicating and controlling the altitude of an aircraft when operating in a unengaged and engaged mode, respectively, comprising: a pressure transducer for producing a voltage representative of the altitude of an aircraft; an amplifier chain for receiving said voltage and a feedback signal and producing an output signal representative of the resultant of said received signals; adjustable feedback signal producing means for producing a feedback signal; first means operable when said system is in its unengaged mode, and responsive to said output signal for adjusting said feedback signal producing means to reduce said output signal to zero; second means, operable when said system is in its engaged mode, for applying said output signal to an external utilization device; and switch means for switching said system from an engaged to an unengaged mode.

4. A servo system comprising: a transducer for producing a voltage representative of a physical parameter; an amplifier having a pair of inputs and an output and being responsive to signals applied to said inputs for producing an output signal on said output corresponding to the resultant of said applied input signals; adjustable feedback signal producing means responsive to applied input signals for adjusting the amplitude of said feedback signal; means for applying said voltage and said feedback signal to said amplifier; and means, selectively operable for applying said output signal to said adjustable feedback signal producing means and an external utilization circuit.

5. A servo system for indicating and controlling the altitude of an aircraft comprising: a pressure transducer for producing a voltage representative of the altitude of an aircraft; adjustable feedback signal producing means; means for summing said voltage and said feedback signal and producing a resultant signal corresponding to the resultant of said voltage and said feedback signal; means responsive to said resultant signal for adjusting said feedback signal to correspond to said voltage; and means for simultaneously fixing the adjustment of said adjustable feedback signal producing means and applying said resultant signal to an external utilization circuit.

References Cited in the file of this patent

UNITED STATES PATENTS

| | | |
|---|---|---|
| 2,734,155 | Schuck | Feb. 7, 1956 |
| 2,748,355 | Jarvis | May 29, 1956 |
| 2,931,965 | Bell | Apr. 5, 1960 |

OTHER REFERENCES

Terman: F. E. Electronic and Radio, page 623, Fig. 18–8: McGraw-Hill, New York, 1955.